United States Patent
Hwang et al.

(10) Patent No.: US 12,167,431 B1
(45) Date of Patent: Dec. 10, 2024

(54) LOW POWER WIDE AREA NETWORK COMMUNICATION MECHANISM

(71) Applicant: Amazon Technologies, Inc., Seattle, WA (US)

(72) Inventors: Yu-Lin Hwang, Hsinchu (TW); Tsun-Nan Chen, Zhubei (TW); Tee Kian Hwee, Zhubei (TW)

(73) Assignee: Amazon Technologies, Inc., Seattle, WA (US)

( * ) Notice: Subject to any disclaimer, the term of this patent is extended or adjusted under 35 U.S.C. 154(b) by 346 days.

(21) Appl. No.: 17/712,848

(22) Filed: Apr. 4, 2022

Related U.S. Application Data (63) Continuation of application No. 16/437,232, filed on Jun. 11, 2019, now abandoned.

(51) Int. Cl.
| | |
|---|---|
| *H04W 72/53* | (2023.01) |
| *H04W 4/80* | (2018.01) |
| *H04W 8/00* | (2009.01) |
| *H04W 40/24* | (2009.01) |
| *H04W 72/0446* | (2023.01) |
| *H04W 72/50* | (2023.01) |

(Continued)

(52) U.S. Cl.
CPC .......... *H04W 72/535* (2023.01); *H04W 4/80* (2018.02); *H04W 8/005* (2013.01); *H04W 40/244* (2013.01); *H04W 72/0446* (2013.01); *H04W 76/11* (2018.02); *H04W 84/10* (2013.01)

(58) Field of Classification Search
CPC .............................. H04W 8/005; H04W 84/10
See application file for complete search history.

(56) References Cited

U.S. PATENT DOCUMENTS

| | | |
|---|---|---|
| 2011/0316716 A1 | 12/2011 | MacKay et al. |
| 2012/0163250 A1 | 6/2012 | Chin et al. |

(Continued)

FOREIGN PATENT DOCUMENTS

| | | |
|---|---|---|
| JP | 2000165405 | 6/2000 |
| JP | WO2016013119 | 6/2017 |

OTHER PUBLICATIONS

Office Action for U.S. Appl. No. 16/437,232, mailed on Sep. 24, 2021, Hwang, "Low Power Wide Area Network Communication Mechanism", 16 pages.

*Primary Examiner* — Sulaiman Nooristany
(74) *Attorney, Agent, or Firm* — Eversheds Sutherland (US) LLP (57) ABSTRACT

The low power wide area network communication mechanism mainly allocates the semi-persistent scheduling (SPS) frames to the terminal devices having network access requirements sequentially by the gateway. The SPS cycle is composed of a plurality of SPS frames and at least one buffering frame. In each SPS cycle, a data reception window is activated by the gateway according to each allocated SPS frames; the SPS frames that the networked terminal devices belong to are activated synchronously within each SPS cycle in order for the networked terminal devices to perform a data transmission with the gateway during each SPS cycle and ensure that the data transmission does not overlap with the data sent by other terminal devices. The scheduling may be re-scheduled at a preset time interval to allocate the SPS frames of terminal devices that are inoperable or out of service area to the terminal devices having network access requirements.

19 Claims, 6 Drawing Sheets

(51) Int. Cl.
 *H04W 76/11* (2018.01)
 *H04W 84/10* (2009.01)

(56) References Cited

U.S. PATENT DOCUMENTS

| | | |
|---|---|---|
| 2017/0071010 A1 | 3/2017 | Lim et al. |
| 2018/0027495 A1* | 1/2018 | Song .................... G06F 1/3206 455/343.2 |
| 2018/0042016 A1* | 2/2018 | Babaei ................. H04W 72/20 |
| 2020/0396750 A1 | 12/2020 | Hwang et al. |

* cited by examiner

LOW POWER WIDE AREA NETWORK COMMUNICATION MECHANISM

CROSS-REFERENCE TO RELATED APPLICATION

This application is a continuation of U.S. patent application Ser. No. 16/437,232, filed on Jun. 11, 2019. The entire contents of which are hereby incorporated by reference as if fully set forth.

BACKGROUND

1. Technical Field

The present disclosure relates to the communication technology of the low power wide area network (LPWAN), mainly provides a LPWAN communication mechanism that may schedule according to the actual network access requirements of the terminal devices and ensures that the data transmissions of the terminal devices do not overlap with each other.

2. Description of Related Art

Different from the traditional short-range communication protocols such as Wi-Fi and Bluetooth, the emergence of Low Power Wide Area Network (LPWAN) technology allows networked environment applications for environmental monitoring, parking, transportation, asset management, lighting, power grids, water resources, wearable products (for pets, toddlers, senior citizens) and the likes in smart cities that require less data transfer rates and operate with low power may be realized.

Due to the unlicensed frequency bands used in the low power wide area network (LPWAN) do not require licenses and fees as long as certain transmission power (generally less than 1 W) is followed and no interference with other frequency bands is caused, thus many LPWAN technologies that operate based on the free to operate frequency bands are emerging rapidly.

SIGFOX, LoRa and NB-IoT are the communication protocols with higher market penetration in the field of LPWAN. Among them all, the application of LoRaWAN communication protocol are more than basic monitoring or sending warning messages. Its core technology architecture and key features have been extended to emerging applications in multiple industries (such as smart cities, industrial Internet of Things, manufacturing, and many other verticals).

In the network system architecture of the current LoRaWAN communication protocol applications, the terminal devices have functions of sensing or collecting data. The gateway has multiple channels for simultaneously receiving data packets sent from each terminal devices and sending data to other terminal devices. The network servers have functions of processing all the packets received by the gateways and sending the correct packets to the application servers. The application servers perform processing (including the storage and analysis of data) on the packets sent by all the terminal devices at the application layer.

For the gateways and each terminal devices among the existing conventional LoRaWAN communication protocol (the communication mechanism), the gateway receives the data packets from each terminal device and sends data to the terminal devices simultaneously, thus the signals are overlapped among different terminal devices. It leads to a phenomenon of the gateway fails to receive the data of all terminal devices completely so that the overall network operation efficiency and the reliability of network communication are not as good as expected.

SUMMARY

In view of the above-mentioned problems of the prior art, the objective of the present disclosure is to provide a LPWAN communication mechanism that may schedule in accordance with the actual network access requirements of the terminal devices and ensure that the data transmission among the terminal devices do not overlap and interfere with each other.

The low power wide area network (LPWAN) communication mechanism of the present disclosure comprises a low power wide area network system architecture comprised of a gateway and at least one terminal device, each terminal device is preloaded with a network identification (ID); the gateway periodically grants a semi-persistent scheduling (SPS) cycle comprised of at least one SPS frame to provide service to the networked terminal devices; wherein the LPWAN communication mechanism at least includes the following processes:

granting network access applications; the gateway broadcasts a set of beacons comprising network identification (Network ID) and system frame information (System Frame Number); when each terminal device receives the beacon broadcasted by the gateway, a network access request message must be sent to the gateway if the network ID that the terminal device belonged to matches with the network ID in the beacon;

allocating the SPS frames; when the gateway receives the network access request message sent from the terminal devices, a network access grant message is sent to the plurality of terminal devices that sent the network access request messages and simultaneously the SPS frames within the system frame information are allocated sequentially to the terminal devices that send the network access request message;

setting a SPS frame activation time; when the terminal devices receive the network access grant message sent from the gateway, the terminal devices immediately start a timer according to the system frame information in order to make the SPS frames which the networked terminal devices belong to may be reactivated repeatedly in each SPS cycle; and activating a SPS cycle service; in each SPS cycle, a data reception window is activated by the gateway according to each allocated SPS frames; the SPS frames that the networked terminal devices belong to are activated synchronously within each SPS cycle in order for the networked terminal devices to perform a data transmission with the gateway during each SPS cycle and ensure that the data transmission does not overlap with the data sent by other terminal devices.

According to the above technical feature, the LPWAN communication mechanism sequentially repeats step a to step d at a preset time interval.

According to the above technical feature, the SPS cycle is composed of a plurality of SPS frames and at least one buffering frame; when the gateway receives the data sent by the terminal device corresponding to each of the SPS frames, a feedback signal is sent to the corresponding terminal device synchronously; any terminal device that has not received the feedback signal from the gateway may perform data transmission to the gateway via the next at least one buffering frame.

According to the above technical feature, the LPWAN communication mechanism repeats step a to step d at a preset time interval; the SPS cycle is composed of a plurality of SPS frame and at least one buffering frame; when the gateway receives the data sent by the terminal device corresponding to each of the SPS frame, a feedback signal is sent to the corresponding terminal device synchronously; any terminal device that has not received the feedback signal from the gateway may perform data transmission to the gateway via the next at least one buffering frame.

Furthermore, via the gateway converting the SPS frames in its system frame information into a network address and in a manner of sending a network access grant message to the terminal devices that have sent network access request messages, the SPS frames in the system frame information are sequentially allocated to the terminal devices that have sent the network access request messages.

Furthermore, when each terminal device receives the beacon broadcasted by the gateway, the terminal device first compares whether a network ID the terminal device belongs to and the network ID in the beacon are matched, if the network ID matches with the network ID in the beacon, a network access request message is sent to the gateway.

Furthermore, via the gateway converting the SPS frames in its system frame information into a network address and in a manner of sending a network access grant message to the terminal devices that have sent network access request messages, the SPS frames in the system frame information are sequentially allocated to the terminal devices that have sent the network access request messages; when each terminal device receives the beacon broadcast by the gateway, the terminal device first compares whether the network ID the terminal device belongs to and the network ID in the beacon are matched, if the network ID matches with the network ID in the beacon, a network access request message is sent to the gateway.

The LPWAN communication mechanism disclosed by the present disclosure is mainly about allocating the SPS frames to the terminal devices having network access requirements by the gateway so that the networked terminal devices may perform a data transmission with the gateway in each SPS cycle and ensure the data sent does not overlap with the data sent from other terminal devices; the scheduling may even be re-scheduled at a preset time interval to allocate the SPS frames of terminal devices that are inoperable or out of service area to the terminal devices having network access requirements; and the terminal device that has not received the feedback signal of the gateway may still send data with the gateway via the buffering frame to enhance the LPWAN operation efficiency and the network communication reliability by a relatively more active and reliable means.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

To understand the technical features, content and advantages of the present disclosure and its efficacy, the present disclosure will be described in detail with references to the accompanying drawings. The drawings are for illustrative and auxiliary purposes only and may not necessarily be the true scale and precise configuration of the present disclosure. Therefore, the scope of the present disclosure should not be limited to and interpreted as the scale and configuration of the attached drawings.

Figure 1:
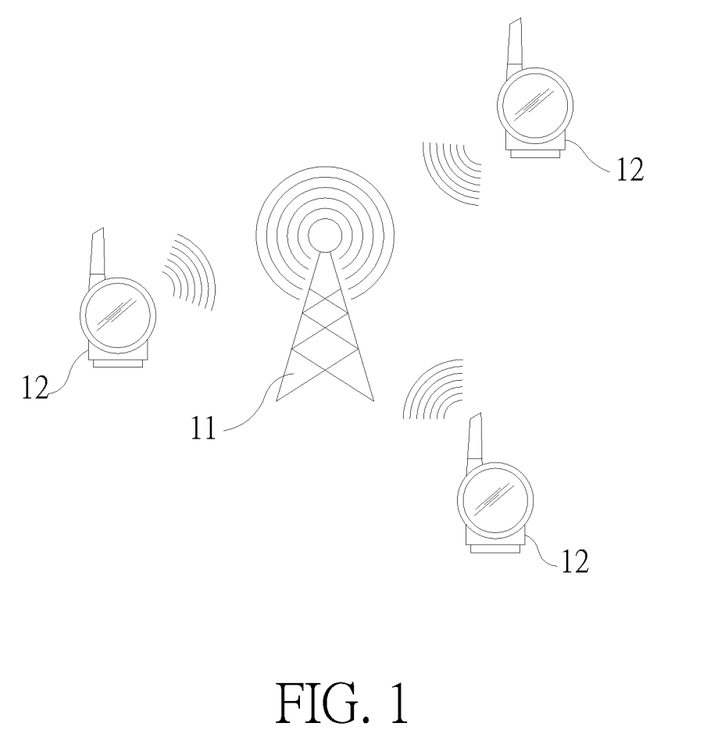
FIG. 1 is a schematic diagram of a network system structure composed of a gateway and respective terminal devices of the present disclosure.
Figure 2:
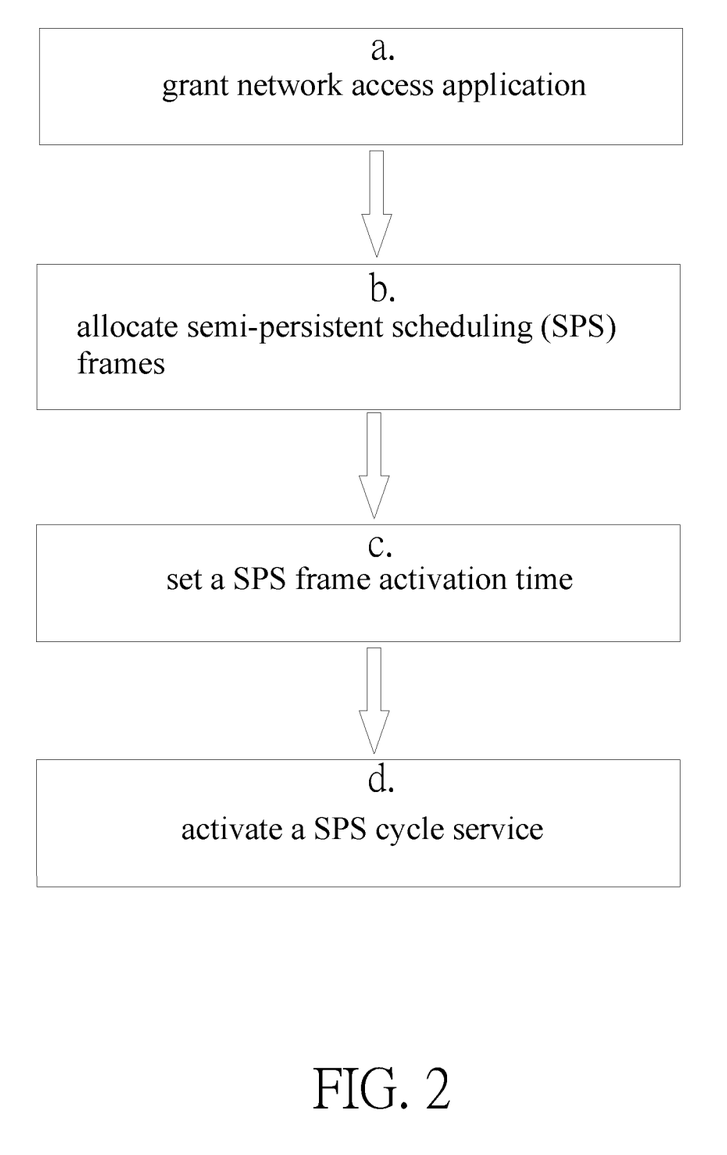
FIG. 2 is a flow chart of the LPWAN communication mechanism of the present disclosure.
Figure 3:
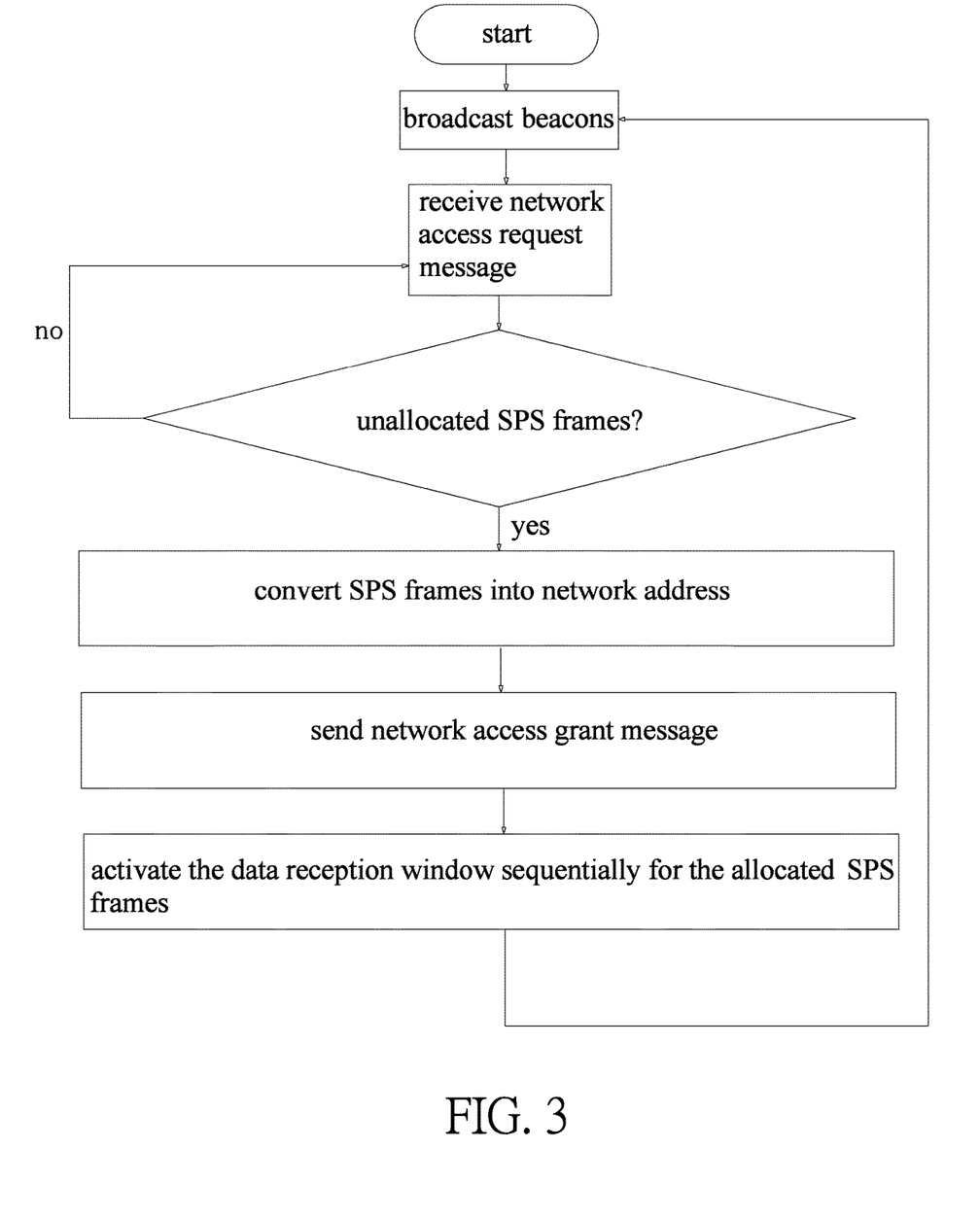
FIG. 3 is the flow chart of the actions being performed by the gateway of the present disclosure.
Figure 4:
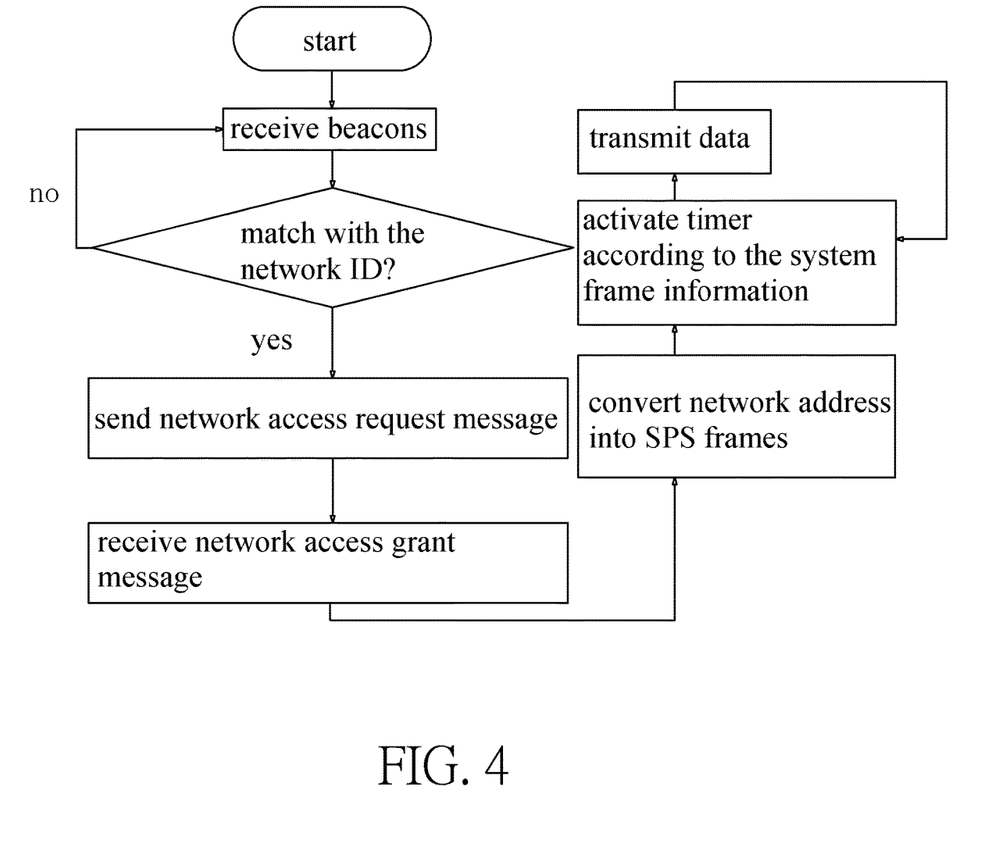
FIG. 4 is the flow chart of the actions being performed by the terminal device of the present disclosure.
Figure 5:
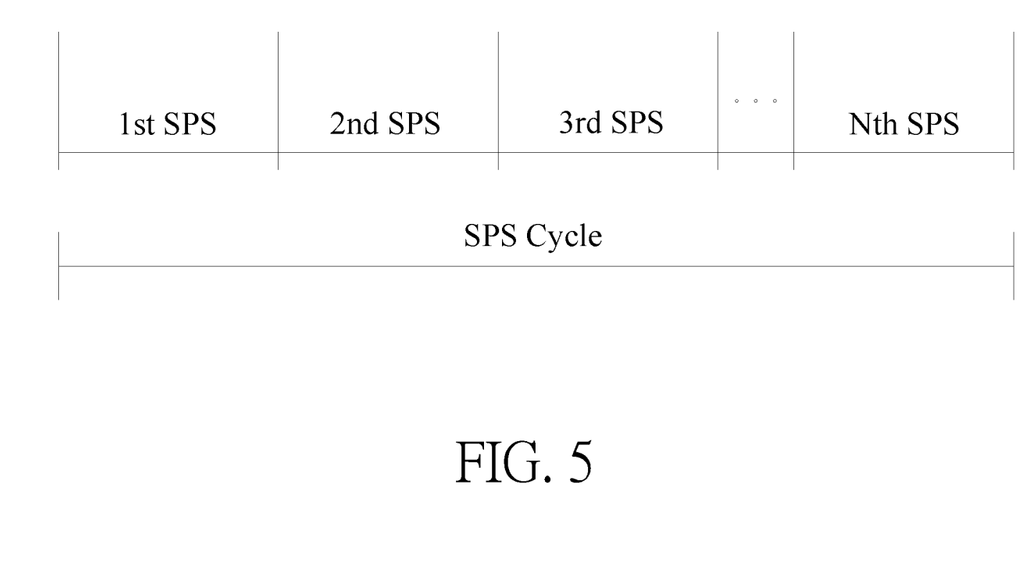
FIG. 5 is schematic view of the first possible implementation of the SPS frame allocation in the SPS cycle of the present disclosure.

The present disclosure mainly provides a LPWAN communication mechanism that may schedule according to the actual network access requirements of the terminal devices and ensure that the data transmission of the terminal device does not overlap with each other. As shown in FIG. 1, the LPWAN communication mechanism of the present disclosure basically composes of a LPWAN system architecture comprised of a gateway (11) and at least one terminal device (12). Each terminal device (12) is preloaded with a network ID. The networked terminal device (12) is serviced by the gateway (11) that periodically grant a SPS cycle including at least one SPS frame. Please also refer to FIG. 1 to FIG. 4, the LPWAN communication mechanism at least includes the following processes:

a. granting network access applications. The gateway (11) broadcasts a set of beacons comprising a network ID and system frame information. When each terminal device (12) receives the beacons broadcasted by the gateway (11), a network access request message must be sent to the gateway (11) if the network ID that the terminal device belonged to matches with the network ID in the beacon.

b. allocating the SPS frame. When the gateway (11) receives the network access request messages sent from the plurality of terminal devices (12), a network access grant message is sent to the terminal devices (12) that sent the network access request messages. Simultaneously, the SPS frames within the system frame information are allocated sequentially to the terminal devices (12) that sent the network access request messages.

c. setting a SPS frame activation time. When the terminal devices (12) receive the network access grant message sent by the gateway (11), a timer is activated according to the system frame information immediately so that the SPS frame the networked terminal devices (12) belong to may be reactivated repeatedly in each SPS cycle.

d. activating a SPS cycle service. The data reception window is activated by the gateway (11) for each allocated SPS frame sequentially in each SPS cycle. The SPS frames that the networked terminal devices (12) belong to are synchronously activated within each SPS cycle in order for the networked terminal device (12) may perform a data transmission with the gateway (11) during each SPS cycle (as shown in FIG. 5) and ensure that the data transmission does not overlap with the data sent by other terminal devices (12).

In the implementation of the LPWAN communication mechanism of the present disclosure, the LPWAN system architecture composed of the gateway (11) and respective terminal devices (12) is mainly applied for communication purposes with low power demand, transmission with long interval or low data transmission network. Each of the terminal devices (12) may be a sensing device used for environmental monitoring, parking, transportation, asset management, lighting, power grid, water resources, etc. to retrieve the relative information or a sensing device presented as a wearable unit for pets, toddlers, or senior citizens that may upload measurement data every hour or at a longer periodicity according to the requirements to the application end so that the application end may manage or master the operational status.

Since the gateway (11) in the LPWAN communication mechanism of the present disclosure only allocates the SPS frames to the terminal devices that have sent the network access request and the gateway (11) activates the data reception window sequentially for the allocated SPS frames in every SPS cycle. And in a manner of the corresponding terminal device synchronously activates its SPS frames to perform data transmission with the gateway (11) while the SPS frames of other terminal devices (12) are not activated hence it is ensured that the data sent does not overlap with the data of other terminal devices. Thus, the objective of enhancing the reliability of the LPWAN communication is achieved.

It is worth mentioning that, in the network system architecture that the LPWAN communication mechanism of the present disclosure is applied, the terminal device (12) served by the gateway (11) may not need to or fail to access the network due to withdrawal, insufficient power, or the wearer leaves the service area; therefore, the LPWAN communication mechanism of the present disclosure re-executes step a to step d within a preset time interval. By re-scheduling in the preset time interval, the SPS frames of the terminal devices that are inoperable or out of service area are allocated to the terminal devices having network access requirements. The operation efficiency of the LPWAN is enhanced with a relatively more active and reliable means.

Figure 6:
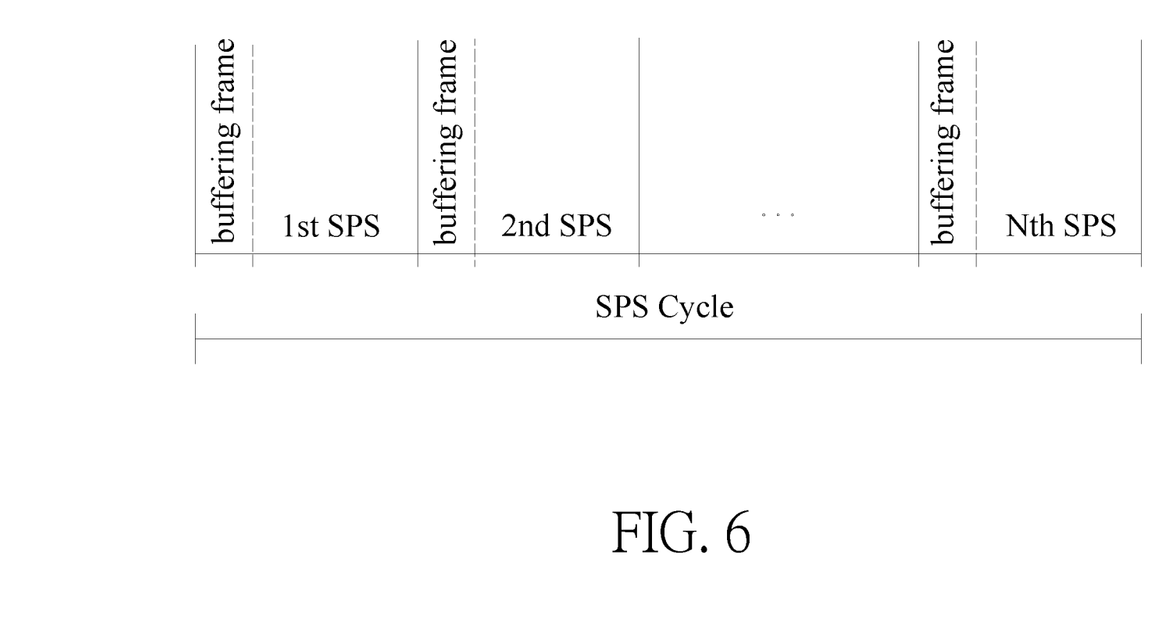
FIG. 6 is a schematic view of is schematic diagram of the second possible implementation of the SPS frame allocation in the SPS cycle of the present disclosure.

Furthermore, there is a possibility that due to uncertainty such as abnormal voltage or interference of other system signals, the data is failed to be uploaded completely while the terminal devices (12) perform data transmission with the gateway (11) with the implementation of the LPWAN communication mechanism of the present disclosure. Therefore, in the implementation of the LPWAN communication mechanism, the SPS cycle may be composed of a plurality of SPS frames and at least one buffering frame (as shown in FIG. 6); and when the gateway (11) receives the data sent by the terminal device (12) corresponding to each of the SPS frames, a feedback signal is sent to the corresponding terminal device (12) synchronously. Any terminal devices (12) that fail to receive the feedback signal of the gateway (11) may perform data transmission with the gateway (11) through the next at least one buffering frame. Thus, every terminal device (12) may upload its data completely to the gateway (11) in each SPS cycle, which enhances the LPWAN communication reliability with a relatively more active and reliable means.

Of course, in the implementation of the LPWAN communication mechanism of the present disclosure, step a to step d are re-executed sequentially in a preset time interval, and the SPS cycle may be composed of a plurality of SPS frames and at least one buffering frame. When the gateway (11) receives the data sent from the corresponding terminal device (12) of each SPS cycle, a feedback signal is sent to the corresponding terminal device synchronously. In the more preferred embodiment, any terminal devices (12) that fail to receive the feedback signal of the gateway (11) may perform data transmission with the gateway (11) via the next at least one buffering frame.

Under various aspects of the possible embodiment disclosed above, in the LPWAN communication mechanism of the present disclosure, by the gateway (11) converting the SPS frame in its system time information into a network address and in a manner of sending network access grant message to the terminal devices (12) that sent network access request messages, the SPS frames in the system frame information are allocated to the terminal device (12) that have sent the network access request message.

Under various aspects of the possible embodiment disclosed above, in the LPWAN communication mechanism of the present disclosure, when each terminal device (12) receives the beacons broadcasted by the gateway (11), the terminal device (12) compares a network ID it belongs to with a network ID in the beacon. If the network ID matches with the network ID in the beacon, then the terminal device (12) sends a network access request message to the gateway (11).

Similarly, under various aspects of the possible embodiment disclosed above, in the LPWAN communication mechanism of the present disclosure, by the gateway (11) is able to convert the SPS frame in its system frame information into a network address and by adopting sending network access grant message to the terminal devices (12) that sent network access request messages, the SPS frames in the system frame information are sequentially allocated to the terminal device (12) that has sent the network access request messages; and when each terminal device (12) receives the beacons broadcasted by the gateway (11), the terminal device (12) first compares the network ID it belongs to with the network ID in the beacon, if the network ID matches with the network ID in the beacon then the terminal device (12) sends a network access request message to the gateway (11).

Compared with the conventional way, the LPWAN communication mechanism disclosed by the present disclosure mainly allocates the SPS frame sequentially by the gateway to the terminal device having network access requirements in order for the networked terminal device is able to perform a data transmission with the gateway during every SPS cycle and ensure there is no overlap with the data sent by the other terminal device. It may even reschedule in the preset time interval to allocate the SPS frames of the inoperable or out of service area terminal devices to the terminal devices having network access requirements; and the terminal device that failed to receive the feedback signal of gateway device may still perform data transmission with the gateway via buffering frame to enhance the operating efficiency and network communication efficiency of LPWANs in a relatively more active and reliable means. The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. A method comprising:
broadcasting first data representing a first network identifier and first frame information;
broadcasting second data representing a second network identifier and second frame information;
receiving, from a first device associated with the first network identifier, second data representing a first network access request;
based at least in part on the receiving of the second data, associating the first device with a first frame from the first frame information, and
sending, to the first device, third data representing a network access grant indication; after the receiving of the first request, receiving, from a second device associated with the second network identifier, fourth data representing a second network access request;
based at least in part on the receiving of the fourth data, associating the second device with a second frame from the second frame information, and
sending, to the second device, fifth data representing a network access grant indication; receiving, from the first device, sixth data during a first period of time that is associated with the first frame;
receiving, from the second device, seventh data during a second period of time that is associated with the second frame, wherein the first period of time is associated with a first cycle and the second period of time is associated with the first cycle;
receiving, from the first device, eighth data during a third period of time that is not associated with the first frame or the second frame, the third period of time being associated with a buffer frame and a second cycle.

2. The method as recited in claim 1, wherein the method further comprises, in response to receiving, from the first device, sixth data during the first period of time that is associated with the first frame, sending, to the first device, eighth data representing a feedback indication.

3. The method as recited in claim 1, wherein the method further comprises receiving, from the first device, eighth data during a third period of time that is not the first period of time, the third period of time being associated with a buffer frame.

4. The method as recited in claim 1, wherein the method further comprises receiving, from the first device, eighth data during a third period of time that is not associated with the first frame or the second frame, the third period of time being associated with a buffer frame.

5. The method as recited in claim 4, wherein the method further comprises receiving, from the second device, ninth data during the third period of time that is not associated with the first frame or the second frame, the third period of time being associated with the buffer frame.

6. The method as recited in claim 4, wherein the method further comprises receiving, from the second device, ninth data during a fourth period of time that is not associated with the first frame or the second frame, the fourth period of time being associated with the buffer frame.

7. The method as recited in claim 6, wherein the receiving, from the first device, of the eighth data during a third period of time that is not associated with the first frame or the second frame occurs as part of a first cycle, and wherein the receiving, from the second device, of ninth data during a fourth period of time that is not associated with the first frame or the second frame occurs as part of a second cycle, the second cycle being different than the first cycle.

8. The method as recited in claim 1, further comprising generating the frame information, the frame information indicating at least the first frame associated with the first period of time and the second frame associated with the second period of time.

9. The method as recited in claim 1, further comprising:
determining a first network address based at least in part on the first frame; and
determining a second network address based at least in part on the second frame;
wherein the third data comprises data representing the first network address; and
wherein the fifth data comprises data representing the second network address.

10. The method as recited in claim 1, wherein the third data comprises data indicating the first frame; and
the fifth data comprises data indicating the second frame.

11. The method as recited in claim 1, further comprising:
determining the first period of time based at least in part on the first frame;
during the first period of time, establishing a first communication with the first device; and
determining the second period of time based at least in part on the second frame; and
during the second period of time, establishing a second communication with the second device.

12. The method as recited in claim 1, wherein:
the receiving of the second data representing the first network access request occurs at a first time;
the receiving of the fourth data representing the second network access request occurs at a second time that is after the first time; and
the associating of the second device with the second frame comprises associating the second device with the second frame that is after the first frame.

13. The method as recited in claim 1, wherein the first frame information comprises information for the buffer frame.

14. The method as recited in claim 1, wherein the method comprises
receiving, from the first device, ninth data during the third period of time that is not associated with the first frame or the second frame, the third period of time being associated with the buffer frame and the second cycle.

15. The method as recited in claim 14, wherein the first frame information comprises information for the buffer frame.

16. A method comprising:
broadcasting first data representing a first network identifier and first frame information;
broadcasting second data representing a second network identifier and second frame information;
receiving, from a first device associated with the first network identifier, second data representing a first network access request;
based at least in part on the receiving of the second data, generating, based in part on the first frame, a first network address, and
sending, to the first device, third data representing a network access grant message, the third data comprising data representing the first network address;
after the receiving of the first request, receiving, from a second device associated with the second network identifier, fourth data representing a second network access request;
based at least in part on the receiving of the fourth data, generating, based in part on the second frame, a second network address, and sending, to the second device, fifth data representing a network access grant message, the fifth data comprising data representing the second network address;

receiving, from the first device, sixth data during a first period of time that is associated with the first frame;

receiving, from the second device, seventh data during a second period of time that is associated with the second frame, wherein the first period of time and the second period of time are associated with a first cycle;

receiving, from the first device, eighth data during a third period of time that is not associated with the first frame or the second frame, the third period of time being associated with a buffer frame and a second cycle.

17. The method as recited in claim 16, wherein the method further comprises, in response to receiving, from the first device, sixth data during the first period of time that is associated with the first frame, sending, to the first device, eighth data representing a feedback indication.

18. The method as recited in claim 16, wherein the method further comprises receiving, from the first device, eighth data during a third period of time that is not the first period of time, the third period of time being associated with a buffer frame.

19. The method as recited in claim 16, wherein the method further comprises receiving, from the first device, eighth data during a third period of time that is not associated with the first frame or the second frame, the third period of time being associated with a buffer frame.

\* \* \* \* \*